United States Patent Office 2,987,137
Patented June 6, 1961

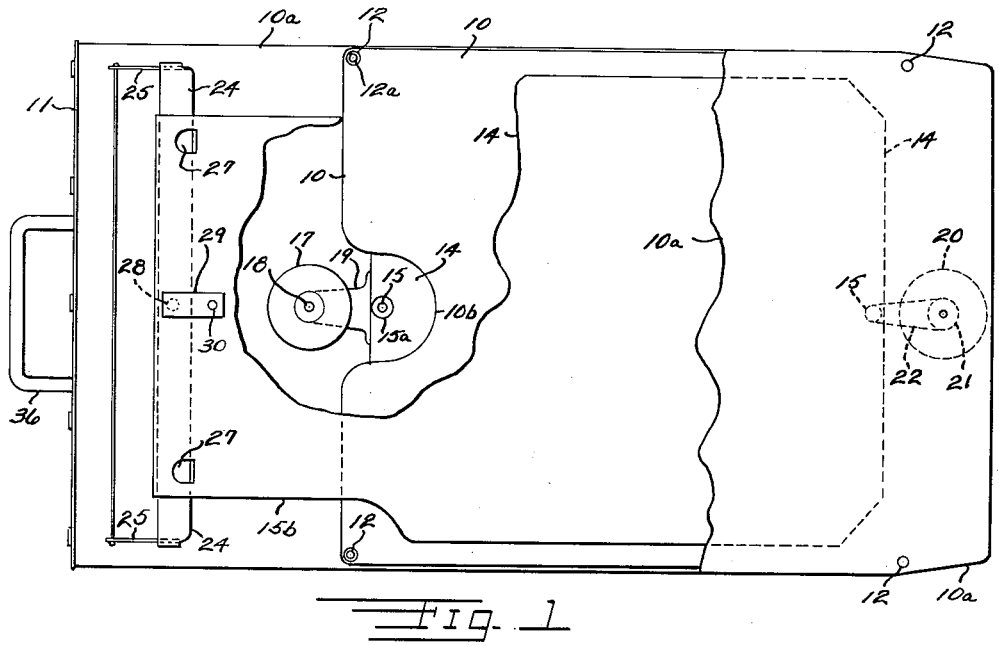
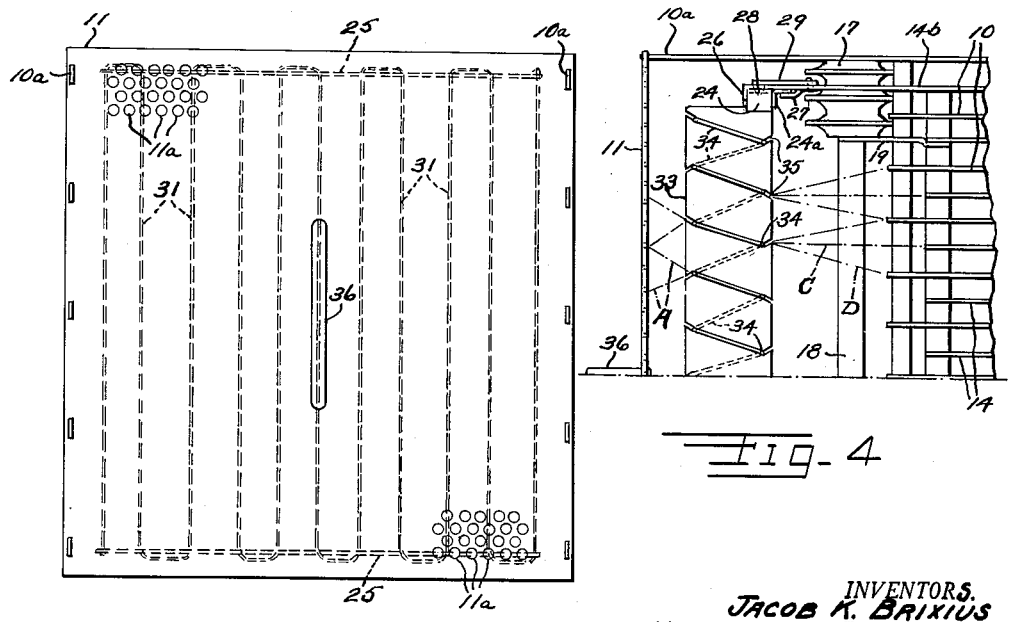

2,987,137
PARTICLE CHARGING APPARATUS FOR ELECTROSTATIC FILTER
Jacob K. Brixius, Parma, and Herbert W. Trenbath, Jr., Shaker Heights, Ohio, assignors, by mesne assignments, to Rockwell-Standard Corporation, Coraopolis, Pa., a corporation of Pennsylvania
Filed Nov. 16, 1955, Ser. No. 547,258
Claims priority, application Great Britain Jan. 25, 1955
1 Claim. (Cl. 183—7)

This invention relates to improvements in apparatus for electrically charging particles entering at the upstream end of an electrostatic filter cell for retention on collecting electrodes in said cell downstream therefrom.

One of the objects of the present invention is to provide in such an electrostatic cell, a foraminous grille at the upstream end thereof forming a wall of the cell at that location, the cell also having opposed side walls and being open on a side between said walls, the fine wire ionizing electrodes being part of a unitary structure comprising a rigid frame supporting spaced brackets between which the fine wire electrodes are held taut, there being ways provided in the cell and opening toward the open side of the cell so that the frame is slidable in the ways to remove the unitary structure from the cell out through the open side thereof.

Other objects of the present invention include the arrangement of the collecting electrodes as a set of parallel spaced charged plates alternating between the plates of a set of parallel spaced grounded plates, in which the laterally outer-most pair of the grounded plates form the opposed side walls of the electrostatic cell; the extension of two of the charged plates upstream from the rest of the set of charged plates and providing the ways for receiving the unitary ionizing structure at the upstream end of said charged plates; the arrangement wherein the grille at the upstream end of the cell is flat and the fine wire electrodes are parallel and lie in a plane parallel to the grille at such a distance therefrom as to provide a charged field between the fine wire electrodes and the grille; specifically, the spacing between the parallel wires in a preferred form is approximately 1.0 to 1.5 times the spacing between the plane of the wires and the front grille.

In a modified form of the apparatus, a second set of parallel fine wire electrodes is mounted on the rigid frame spaced from the plane of the above mentioned first named fine wire electrodes and in a plane parallel thereto and downstream therefrom. Preferably, in this modified form, each of the wires of the second set of fine wire electrodes lies approximately mid-way between the extended planes of two of the grounded plates, and the grounded plates have upstream edges parallel to the second set of fine wire electrodes so that ionization takes place between the fine wire electrodes of the second set and the upstream edges of the ground plates.

In the drawings,

FIG. 1 is a side elevational view of an electrostatic cell illustrating the invention, with part broken away to more clearly show the construction;

FIG. 3 is a top plan view of the electrostatic cell of FIGS. 1 and 2; while

FIG. 4 is a fragmental view taken from the same position as the view of FIG. 3 but illustrating a modified form of the invention.

Figure 2:
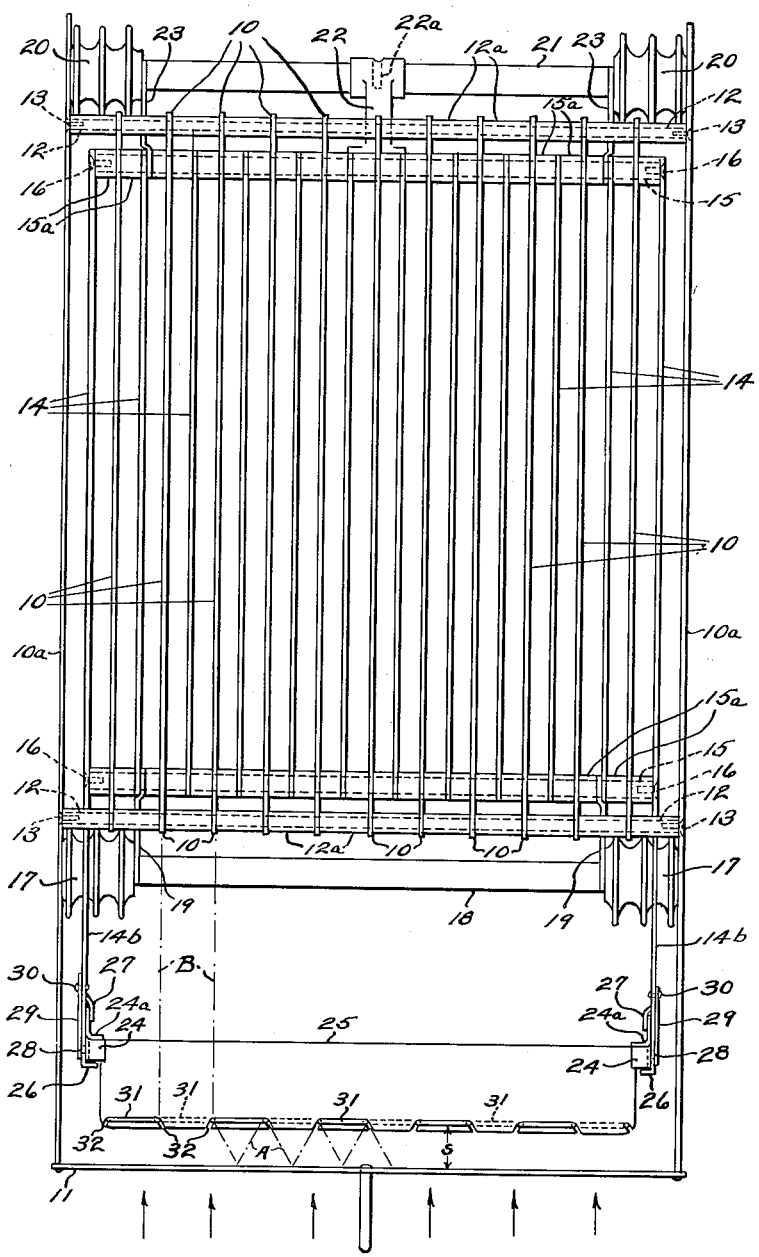
FIG. 2 is a front elevational view of the cell of FIG. 1 taken from the left-hand end thereof.

While this invention might be applied to a number of different types of electrostatic filter cells, it is shown in accompanying drawings as applied to a filter of the type disclosed and claimed in the patent of C. W. Savitz, U.S. 2,639,781.

Referring to FIGS. 1, 2 and 3, one of these filter cells comprises a set of grounded collector plates 10 which are parallel to each other, and of which the two laterally outermost plates 10a extend farther upstream than the rest of the set to the forward end of the cell where they are rigidly connected together by a foraminous grille 11. In the form shown, this grille is uniformly perforated with through holes 11a as illustrated in FIG. 2 although other forms of grille could perform this function. One of the purposes of this grille is to cause an even distribution of the air over the face of the filter cell as viewed in FIG 2 so that the flow of air per unit of cross-section of the filter cell is comparatively uniform. The set of grounded collector plates is held together by four rods 12 which extend between the parallel plates 10a and are held thereto by screws 13 which pass through the plates and into the ends of the rods.

Alternating between the grounded collector plates, there is a second set of charged plate electrodes 14 which are assembled together on a bar 15 centrally of each end of the plates and held apart by collar spacers 15a. The two laterally outermost plates of this set extend upstream from the rest of the plates of the set as indicated at 14b for a purpose later described. This set of plates is held assembled by screws 16 which pass through the outermost plates and into the ends of the bars 15. To hold the set of charged collector electrode plates in proper position alternating between the grounded plates 10, at the upstream end of the cell, a pair of electrical insulators 17 is rigidly supported from the plates 10a and a bar 18 extends rigidly between these insulators. A pair of brackets 19 rigidly connects the bar 18 to the bar 15 at this end of the cell. At the downstream end of the cell, insulators 20 are rigidly secured to the side plates 10a and a bar 21 is rigidly supported between these insulators. At the center of the cell, the bar is provided with a bracket 22 which is rigidly connected, and forms an electrical conductor, between the bar 21 and the bar 15 at that end of the cell. When the cell is in use, high voltage substantially direct current is supplied to the set of charged collector plates 14 by means of an electrical plug which enters the recess 22a in the bracket 22 in the manner taught in the above mentioned Savitz patent. Other brackets 23 are rigidly connected between the bar 21 and the bar 15 at the downstream end of the cell so that the charged electrode plates are firmly held in the position shown in FIG. 3.

The present invention provides a novel particle charging structure at the upstream end of the cell. This structure comprises rigid end frame members 24 which rigidly support top and bottom brackets 25 which are parallel to each other and extend generally in the direction of stream flow through the cell. Rigidly secured to the frame members 24 are angle shape members 24a which extend from top to bottom of the frame. The frame members 24, 24a are adapted to slide out of the open top of the cell, between the side walls 10a, in ways provided between the flanges 26 on the end of the plate portions 15b and ears 27 struck up inwardly from the plate portions 15b so as to overlie the angle members 24a as clearly shown in FIGS. 1 and 3. It results from this structure, that the unitary structure comprising the members 24, 24a and 25 is adapted to slide vertically out of the cell through the open top thereof. Preferably, detent members 28 are provided for holding each of the frame members 24 in the proper position with respect to the plate portions 15b. As shown in FIGS. 1 and 3, these detent members are in the form of buttons rigidly secured in leaf spring members 29 which are riveted at 30 to the plate portions 15b. These buttons 28 enter into suitable openings in the frame members 24 to hold the frame members in their proper position.

Fine wire electrodes 31 are held taut between the parallel brackets 25 in a plane generally parallel to the flat grille 11. While individual fine wires might be strung parallel to each other between brackets 25, in a preferred form of the invention, a single fine wire is threaded through the notches 32 in the upstream edges of the plates 25. Referring to FIG. 3, the fine wire 31 is secured in the left-hand notch 32 in the lower bracket 25, then passes upwardly through the same notch in the upper bracket 25, then across the top of upper bracket 25 as seen in full lines in FIG. 3, then downwardly from the top bracket to the bottom bracket in the second notch 32 from the left-hand end, then below the bottom bracket 25 as indicated in broken lines in FIG. 3, then upwardly in the third notch, downwardly in the fourth notch, etc. At the right-hand end of the brackets 25, the loose end of wire 31 is firmly secured in any suitable manner.

While the fine wire electrodes are shown running vertically, they might extend horizontally, that is crosswise of the collector plates. The spacing between the parallel fine wire electrodes 31 and the spacing $s$ from the plane of the fine wire electrodes to the front grille 11 must be carefully arranged so that the field of ionization, as represented by the dot-dash lines in FIG. 3, will cover the entire upstream face of the filter cell. In a preferred arrangement of this invention wherein the distance $s$, measured in inches from the fine wire electrodes to grille, and E represents the kilovoltage of the electrical charge on the fine wires, and $k$ is a constant varying according to the fine wire diameter, a preferred arrangement is represented by the formula $s = k \times E^{1.5}$. Utilizing this formula, where the charge is 10 kilovolts and $k$ is 0.27 for a .004 inch diameter fine wire, the distance $s$ is calculated to be 0.865 inch as the distance from the fine wires to the grille. There is a little latitude in the spacing between the parallel fine wires 31 and efficient operation is obtained where the spacing between parallel wires 31 is from 1.0 to 1.5 times the distance $s$ from the wires to the grille. In one embodiment of the invention, the distance between parallel wires 31 was equal to 1.3 $s$.

Referring to FIG. 3 of the drawings, the dot-dash lines B indicate that the fine wire electrodes 31 lie approximately in the planes of the plates 10 as these planes are extended upstream. While this is a preferred form, it is not absolutely necessary to the operation of my invention.

In the modification shown in FIG. 4, all of the parts are the same as those just described, except for the following changes. Top and bottom brackets 33 similar to those described at 25, are rigidly connected together by the end frame members 24. The modification consists in supplying a second set of fine wire electrodes arranged parallel to each other in a plane parallel to the front grille and downstream from the first-mentioned set of fine wire electrodes. Reading from the top of FIG. 4 downwardly, the fine wire electrode is secured to the bottom bracket 33 and comes upwardly through the first front notch, then across the top of the upper bracket 33 to the first notch 35, then downwardly to the bottom bracket 33, along the under face of the bottom bracket as indicated in broken lines in FIG. 4, then upwardly through the second front notch, then across the top of the upper bracket 33 to the second notch 35, then downwardly, etc. working in this fashion clear across the brackets 33 in a single length of fine wire with its free end firmly secured in place. Preferably, the notches 35 are so arranged in this form of the invention that the parallel wires 34 at the downstream edge of the brackets 33, lie in the planes indicated by the dot-dash lines C which are extensions of the charged plates 14 and midway between grounded plates 10. The upstream edges of the plates 10 are generally parallel to the fine wire electrodes 34 so that ionization takes place between the fine wires 34 along the dot-dash lines D to the upstream edges of the grounded plates 10. This gives a second complete coverage of the cross-section of the filter cell for ionization of particles as represented by the lines D of FIG. 4 along with the field of ionization represented by the lines A of FIG. 4 similar to that described in connection with FIG. 3. Preferably also in the modification of FIG. 4, the rear edge of the brackets 33 is a little closer to the collector plate electrodes than in the case of the brackets 25 of FIGS. 1, 2 and 3.

Preferably, some means is provided for moving the cells into and out of holding frames as described in the above mentioned Savitz patent, and for this purpose a handle 36 is rigidly secured to the front grille 11.

Those skilled in this art will recognize that the electrical signs might be changed as between wires 31 and grille 11. For instance, just inside of grille 11 a charged perforate surface could be provided, insulated from the outside walls of the cell. Then wires 31 could be connected to some grounded portion of the cell, such as by suspension from the grounded set of collector plates.

What is claimed is:

Apparatus for electrically charging particles entering at the upstream end of an electrostatic filter cell for retention on collecting electrodes in said cell downstream therefrom, said collecting electrodes consisting of a set of parallel spaced charged plates alternating between the plates of a set of parallel spaced grounded plates, the laterally outermost pair of said grounded plates forming vertically extending opposed side walls for said cell, a grounded foraminous grille at the upstream end of said cell forming a wall of said cell and connected with the laterally outermost pair of said grounded plates, a unitary structure comprising a plurality of fine wire charging electrodes held taut between spaced brackets and a rigid frame holding said brackets spaced, the two outermost plates of said set of parallel spaced charged plates extending upstream from the rest of said set of charged plates, vertically extending ways carried by the upstream ends of said two extending charged plates, and said frame being slidable in said ways to remove said unitary structure from said cell; said cell being open at the top opposite said unitary structure for this purpose, said brackets and frame and ways being electrically conductive and said fine wire charging electrodes being thus electrically connected to said two extending charged plates.

References Cited in the file of this patent

UNITED STATES PATENTS

| 2,486,520 | Dahlman | Nov. 1, 1949 |
| 2,504,430 | Lincoln | Apr. 18, 1950 |
| 2,639,781 | Savitz | May 26, 1953 |
| 2,696,893 | Richardson | Dec. 14, 1954 |
| 2,780,305 | Bonatz | Feb. 5, 1957 |